United States Patent Office 3,371,073
Patented Feb. 27, 1968

3,371,073
POLYSULFONAMIDES
Harry A. Smith, Midland, Mich., assignor to The Dow Chemical Company, Midland, Mich., a corporation of Delaware
No Drawing. Filed Jan. 28, 1966, Ser. No. 523,560
7 Claims. (Cl. 260—79.3)

The present invention relates to a class of new polysulfonamides and to a novel process for preparing these materials.

It is known to make polysulfonamides by the condensation of polyfunctional reactants, for example, by the reaction of a diamine with a disulfonyl chloride where the diamine and the disulfonyl chloride each can be either aromatic or aliphatic in nature. This known reaction is ordinarily carried out in aqueous or other solvent suspension or solution. The products thereby obtained usually have relatively low melting points and little if any solubility in water.

Water-soluble polymers such as certain derivatives of cellulose are known and are used to make water-soluble films, adhesives, and the like. However, these materials are also relatively low-melting and tend to break down and discolor at temperature above 200° C.

A class of polysulfonamides has now been discovered which are both water-soluble and also stable at their relatively high melting points, these running generally in the range of 250–300° C. These new polymers are N-acylated aromatic polysulfonamides which have a structure composed essentially of recurring units of the formula

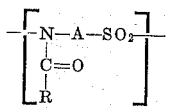

where R is an alkyl radical of 1–3 carbon atoms and A represents a nonvicinal divalent aromatic carbocyclic radical. By the term nonvicinal divalent aromatic carbocyclic radical is meant arylene and substituted arylene radicals other than ortho-arylene and their substituted derivatives. The alkyl radicals represents by R include methyl, ethyl, propyl, and isopropyl and R is preferably a methyl radical. The aromatic radicals represented by A include nonvicinal divalent carbocyclic radicals of the benzene and naphthalene series such as meta and para-phenylene, 1,4-naphthylene, 1,3-naphthylene, 2,6-naphthylene, and these radicals having one to two unreactive substituents such as halogen, lower alkyl, lower alkoxy, and nitro. By the terms lower alkyl and lower alkoxy is meant those radicals having 1–4 carbon atoms. Preferably A is a phenylene radical, particularly a p-phenylene radical having the formula

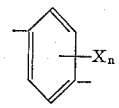

where X is one of the substituents named above and $n$ is 0–2.

The polysulfonamides of the present invention are light-colored, largely non-crystalline solids which soften or melt at temperature above about 200° C., usually at about 250–300° C. They are easily molded at these temperatures to form strong, flexible, and water-soluble adhesives which are strongly adherent to wood, paper, cloth, leather, and metals and they are, therefore, useful for bonding such materials.

It is possible to make the present polysulfonamides by preparing a non-acylated polymer from the condensation of an aminobenzenesulfonyl chloride and then acylating the amide nitrogen atoms by conventional procedure. However, it has been found that the N-acylsulfonamide polymers of this invention are more conveniently prepared and are obtained in higher and more uniform quality by subjecting the monomeric sulfonyl halide to a temperature of 125–300° C., for a period of time sufficient to effect a significant degree of self-condensation. The sulfonyl halide starting material has the formula

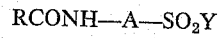

where R and A are as defined above and Y is any halogen, i.e., fluorine, chlorine, bromine, or iodine. Preferably, Y is chlorine. Suitably, this condensation is carried out by heating the starting halide above its melting point and maintaining the temperature at a level where the condensing material is at least in part in the liquid state. The liberated hydrogen halide is vaporized and so is effectively removed from the polymerizing mass. Under these conditions, the condensation is substantially completed in 1–50 hours, depending upon the temperature employed. An inert solvent can be employed in the condensation process, but no particular advantage is gained.

The polysulfonamides thereby produced have molecular weights ranging from about 2000 to about 60,000 or somewhat higher and so contain in their molecular structure about 10–300 of the recurring units described above. Polymers in the higher molecular weight range are obtained by excluding traces of moisture during the condensation and thereby preventing any significant hydrolysis of the sulfonyl chloride group to a sulfonic acid, this latter product acting as a chain terminator. These polymers are soluble in water and are also soluble to some extent in other polar solvents such as methanol, ethanol, and the like. They are substantially insoluble in non-polar organic solvents.

Example 1

N-acetylsulfanilyl chloride was prepared by reacting acetanilide with excess chlorosulfonic acid for two hours at 60° C., and pouring the reaction mixture over ice. The isolated and dried N-acetylsulfanilyl chloride, M.P. 147–149° C., was heated for 28.5 hours at 150° C., thereby causing evolution of HCl and the formation in about the theoretical yield of a linear polymer having a molecular structure consisting essentially of recurring units of the formula

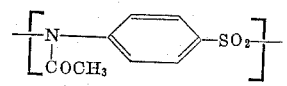

The polymer was a glassy light brown solid softening above 260° C. to a viscous fluid. This product had an average molecular weight of about 4000. It was soluble in water and methanol, insoluble in most organic solvents. On molding at 300° C. and 300 lbs. per square inch pressure between two sheets of aluminum, a tough flexible film was produced which strongly bonded the two aluminum sheets.

Example 2

The procedure of Example 1 was repeated except that the N-acetylsulfanilyl chloride was condensed by heating immediately after preparation and thorough drying, thereby minimizing the slow hydrolysis caused by prolonged contact with atmospheric moisture. In this way, a polysulfonamide was obtained which was otherwise similar to the product of Example 1, but which had an average molecular weight of 40,000. This polymer softened in the range 250–300° C.

Example 3

N-acetylsulfanilyl chloride was heated for 12 hours at 200 °C. to produce a polysulfonamide similar to that described in Example 1. This material had an average molecular weight of 6000 by chlorine end group analysis.

*Example 4*

N-acetyl-1-naphthylamine was reacted with excess chlorosulfonic acid as in Example 1 to make the N-aceyl-1-naphthylamine-4-sulfonyl chloride, a purplish solid. This compound was heated 28 hours at 150° C., to form a linear polysulfonamide analogous to the product of Example 1. This polymer was a brownish purple color and melted at 285–300° C. It was soluble in water and ethyl alcohol, insoluble in methylene chloride and benzene.

*Example 5*

Using the procedure of the foregoing examples, o-acetanisidide was chlorosulfonated to make N-acetyl-3-methoxysulfanilyl chloride. This compound lost HCl and polymerized to a linear polysulfonamide similar to the product of Example 1 upon heating at 150° C. The polymer was a tan glassy solid melting above 300° C. It was soluble in water but was insoluble in most organic solvents. It could be molded above 300° C. to form tough, flexible films.

*Example 6* m-Chloroacetanilide was chlorosulfonated as shown above to make the N-acetyl-2-chlorosulfanilyl chloride, M.P. 115–120° C. This product was thermally polymerized as in Example 1 to make a light brown N-acetylated polysulfonamide softening at about 200° C. This polymer had properties similar to those of the products of Examples 1–4.

*Example 7*

The procedure of Example 1 was repeated starting with m-nitroacetanilide and chlorosulfonating to obtain N-acetyl-2-nitrosulfanilyl chloride, M.P. 185–205° C. Heating this compound above 150° C. yielded the N-acetylated linear polysulfonamide, a tan solid melting above 300° C.

Other acylaminoaryl halides are similarly prepared and converted into the corresponding N-acyl polysulfonamides by the general procedure described above. For example, N-propionylmetanilyl bromide is heated at 150–200° C. to liberate HBr and produce the N-propionyl polymetanilamide, N-acetyl-3,5-dichlorosulfanilyl chloride is similarly condensed to form the corresponding acetylated polysulfonamide, and N-butyryl-6-methyl-metanilyl chloride is heated to make the acylated polysulfonamide. These polymers have properties similar to those described in the foregoing examples.

I claim:

1. A solid polysulfonamide having a molecular structure consisting essentially of recurring units of the formula

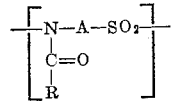

wherein R is an alkyl radical of 1–3 carbon atoms and A is a nonvicinal divalent aromatic carbocyclic radical.

2. The polysulfonamide of claim 1 wherein R is methyl and A is a p-phenylene radical of the formula

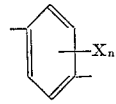

wherein X is halogen, lower alkyl, lower alkoxy, or nitro, and *n* is an integer from zero to two.

3. The polysulfonamide of claim 2 wherein *n* is zero.

4. The polysulfonamide of claim 1 wherein R is methyl and A is a nonvicinal naphthylene radical.

5. A process for making a solid polysulfonamide which comprises subjecting a compound of the formula

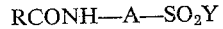

to a temperature of 125–300° C., for a period of time sufficient for a significant amount of self-condensation to take place, wherein in said formula R in an alkyl radical of 1–3 carbon atoms, A is a nonvicinal divalent aromatic carbocylic radical, and Y is halogen.

6. The process of claim 5 wherein R is methyl, Y is chlorine, and A is a p-phenylene radical of the formula

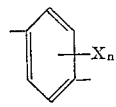

wherein X is halogen, lower alkyl, lower alkoxy, or nitro, and *n* is an integer from zero to two.

7. The process of claim 5 wherein R is methyl, Y is chlorine, and A is a nonvicinal naphthylene radical.

No references cited.

JOSEPH L. SCHOFER, *Primary Examiner.*

D. K. DENENBERG, *Assistant Examiner.*